(12) United States Patent
Chou

(10) Patent No.: US 8,574,104 B2
(45) Date of Patent: Nov. 5, 2013

(54) INFLATABLE SPORT BALL STRUCTURE AND MANUFACTURING METHOD THEREOF

(75) Inventor: Keng-Hua Chou, Yilan County (TW)

(73) Assignee: Hung Da Chou, Luodong Township, Yilan County (TW)

( * ) Notice: Subject to any disclaimer, the term of this patent is extended or adjusted under 35 U.S.C. 154(b) by 195 days.

(21) Appl. No.: 12/709,517

(22) Filed: Feb. 22, 2010

(65) Prior Publication Data

US 2011/0015011 A1 Jan. 20, 2011

(30) Foreign Application Priority Data

Jul. 14, 2009 (CN) .......................... 2009 1 0054734

(51) Int. Cl.
*A63B 41/08* (2006.01)
(52) U.S. Cl.
USPC .......................................... 473/605; 473/599
(58) Field of Classification Search
USPC .................... 473/595, 599, 604, 605
See application file for complete search history.

(56) References Cited

U.S. PATENT DOCUMENTS

| 2,302,985 | A | * | 11/1942 | Voit et al. | 156/147 |
| 2,494,796 | A | * | 1/1950 | Brown | 473/605 |
| 2,662,771 | A | * | 12/1953 | Crowley | 473/610 |
| 7,300,369 | B2 | * | 11/2007 | Krysiak et al. | 473/604 |
| 2003/0073527 | A1 | * | 4/2003 | Ou Chen | 473/604 |
| 2008/0058134 | A1 | | 3/2008 | Yang | |
| 2009/0325747 | A1 | * | 12/2009 | Ou | 473/605 |

FOREIGN PATENT DOCUMENTS

| CN | 2445765 Y | 9/2001 |
| CN | 200995038 Y | 12/2007 |
| CN | 101244327 A | 8/2008 |

* cited by examiner

*Primary Examiner* — Vishu K. Mendiratta
(74) *Attorney, Agent, or Firm* — patenttm.us

(57) ABSTRACT

An inflatable sports ball structure and a manufacturing method thereof are disclosed. The inflatable sports ball structure comprises of an inner bladder, a reinforced carcass containing thread, and an exterior material layer. The reinforced carcass covers the surface of the inner bladder, and has a thread wound layer. Part of the thread wound layer is embedded in the reinforced carcass and provides a constricting force towards the inner bladder, and a small remaining part of the thread wound layer may be exposed on the outer surface of the reinforced carcass.

7 Claims, 5 Drawing Sheets

US 8,574,104 B2

INFLATABLE SPORT BALL STRUCTURE AND MANUFACTURING METHOD THEREOF

RELATED APPLICATIONS

This application claims priority to China Application Serial Number 200910054734.7 filed Jul. 14, 2009, which is herein incorporated for reference.

BACKGROUND

1. Technical Field

The disclosure relates to the structure and manufacturing method of a sports ball, more particularly to the structure and manufacturing method of an inflatable sports ball.

2. Description of Traditional Technique

Referring to FIG. 1A and FIG. 1B. FIG. 1A is a schematic view of a conventional inflatable sports ball and FIG. 1B is a cross sectional view of FIG. 1A along the A-A line. The conventional inflatable sports ball 5 includes an inner bladder 50, a thread layer 51 and an outer material layer 52; the inner bladder 50 is made of rubber material, and the surface of the inner bladder 50 is wound with thread preset with adhesives so that the thread is firmly combined with the outer surface of the inner bladder 50, the thread layer 51 is therefore fixed to the outer surface of the inner bladder 50, then the thread layer 51 on the outer surface of the inner bladder 50 is vulcanized to control the roundness and the size of the inflated sports ball. Afterwards, the outer material layer 52 is laminated or stitched to the thread layer 51.

However, after the thread is wound around the outer surface of the inner bladder 50 of the conventional sports ball 5, the content of thread layer 51 may likely have a chance of detaching from the inner bladder 50 due to the application of external force, thus affecting the quality of the whole ball. Furthermore, the material of which the inner bladder 50 is made is selected mainly for the purpose of allowing low air permeability and preventing air leakage. Since the rebound provided is limited, it is not capable of meeting the expected standard of performance.

SUMMARY OF INVENTION

One of the purposes of the present disclosure is to provide an inflatable sports ball structure with an increased rebound and strength.

A second purpose of the present disclosure is to achieve an inflatable sports ball structure with an increased softness to the touch.

A third purpose of the present disclosure is to provide an inflatable sports ball structure with a stronger binding force for the thread winding.

A fourth purpose of the present disclosure is to provide an inflatable sports ball structure with an increased tolerance for internal air pressure.

A fifth purpose of the present disclosure is to provide an inflatable sports ball structure with the increased weight from the reinforced carcass containing thread, the thickness of the outer material layer and the inner bladder needed to be increased for meeting a standard weight is compensated, so the raw material cost for increasing the weight of the inner bladder as well as increasing the thickness of the outer material layer is significantly reduced.

The construction of this disclosure for achieving the aforementioned aspects is to provide an inflatable sports ball structure that includes an inner bladder with a spherical shape after being inflated, and a reinforced carcass containing thread. The reinforced carcass covers the surface of the inner bladder, and has a different material composition from the inner bladder. The reinforced carcass is covered with an interwoven thread winding layer. Most part of the thread wound layer is embedded in the reinforced carcass, and a small part of it is exposed on the surface of the reinforced carcass. The thread wound layer provides a constricting force towards the inner bladder. With the reinforced carcass and the thread wound layer embedded therein, the whole structure of the inflatable sports ball is strengthened.

In this disclosure, the inflatable sports ball structure is further installed with an external material layer covering the surface of the reinforced carcass. The reinforced carcass and the external material layer can be combined by means of a layer of adhesive applied manually or mechanically. Or the external material layer can be attached to the surface of the reinforced carcass by means of hand-stitching or machine-stitching.

In one embodiment of the present disclosure, the reinforced carcass contains a layer of synthetic rubber to provide rebound and softness.

In one embodiment of the present disclosure, the reinforced carcass includes synthetic rubber while the inner bladder includes composite material of natural rubber, latex, or synthetic rubber which can be butyl rubber, neoprene rubber, or styrene-butadiene rubber.

In one embodiment of the present disclosure, the external material layer may include genuine or artificial leather-made products.

Another solution of this disclosure is to provide an inflatable sports ball structure, mainly includes an outer skin layer, an inner bladder layer made of natural rubber, latex, synthetic rubber or combination thereof, and a carcass made of synthetic rubber and placed between the inner bladder layer and the external material layer. In here, a thread wound layer in a weaving pattern is partially embedded in the carcass layer, and a small part of the thread wound layer is exposed on the carcass layer made of synthetic rubber facing the inner surface (side) of the external material layer.

Another solution of this disclosure is to provide a manufacturing method of inflatable sports ball. The method starts with the first step of inflating an inner bladder to be used in a sports ball and disposing the inner bladder in a machine laminating adhesion mold. Surface of the mold is lined with a plurality of solid synthetic rubber sheets in advance. The second step is joining the solid synthetic rubber sheets on the surface of the inflated inner bladder through the machinery adhesion mold to cover the surface completely. The third step follows by winding a continuous thread on the surface of the synthetic rubber sheets from multiple directions in order to tighten the synthetic rubber sheets towards the inflated inner bladder. The fourth step is to vulcanize these wound synthetic rubber sheets so that the thread and synthetic rubber form an integral layer on the surface of the inflated inner bladder. The majority of the thread is now invisible as it is embedded in the synthetic rubber layer, thus, a reinforced carcass is formed. The final step of producing a sports ball is to attach the choice of external material to this reinforced carcass by lamination or stitching.

In one embodiment of the present disclosure, the operation of vulcanizing the synthetic rubber sheets further includes heating and softening the synthetic rubber sheets at the heating temperature of 150-170 degrees Celsius.

In one embodiment of the present disclosure, the manufacturing method of inflatable sports ball further includes attaching or sewing an external material layer to the reinforced carcass manually by hand or mechanically by machine.

According to this we can learn that the inflatable sports ball structure and the manufacturing method provided by the present disclosure can replace the conventional structure and manufacturing method thereof to provide better solutions for performance and production cost.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure discloses an inflatable sports ball structure and manufacturing method thereof. The sports ball can be understood as a soccer ball, handball, basketball, volleyball, American football or rugby ball, hereinafter these balls are referred to as inflatable sports balls.

Figure 1A:
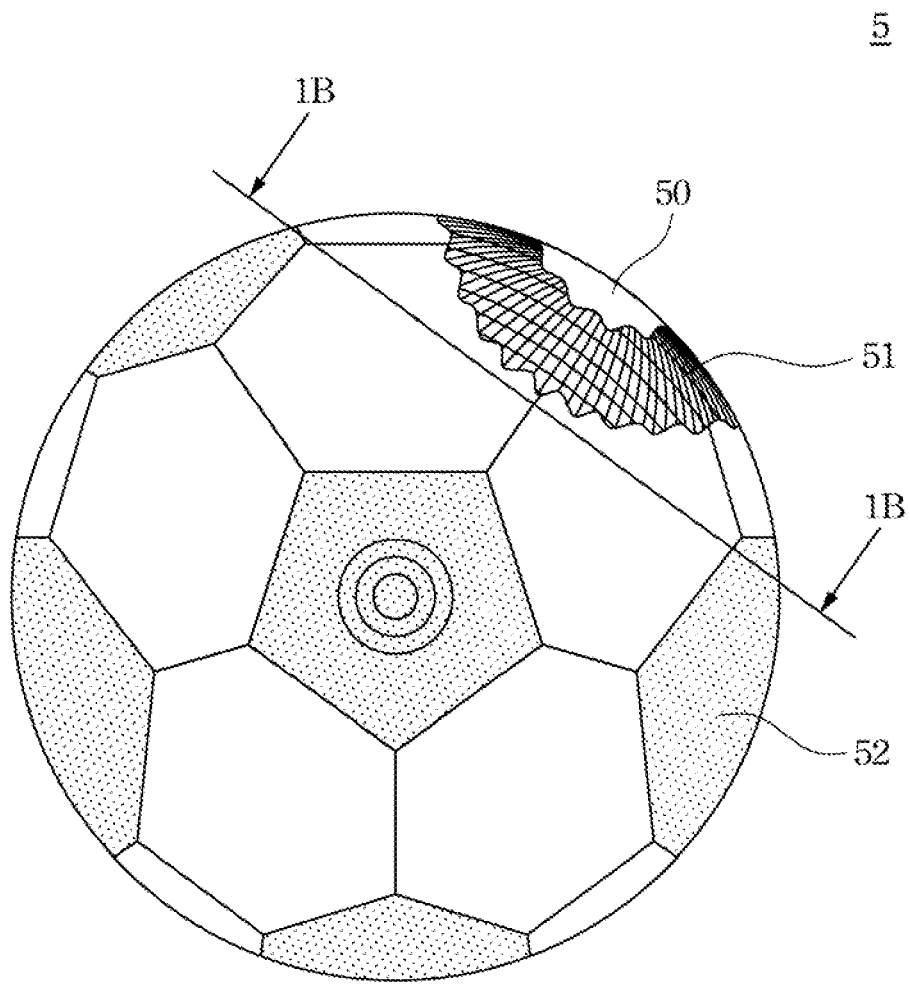
FIG. 1A is a schematic view of a conventional inflatable sports ball.
Figure 1B:
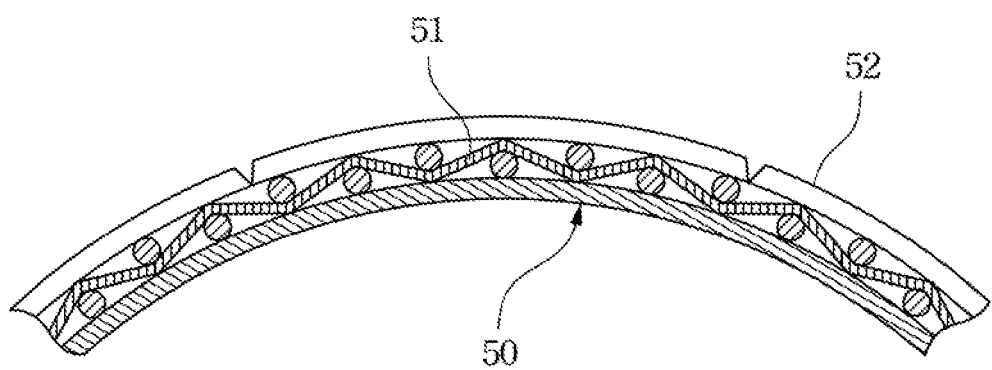
FIG. 1B is a cross section view of FIG. 1A along an A-A line.
Figure 2A:
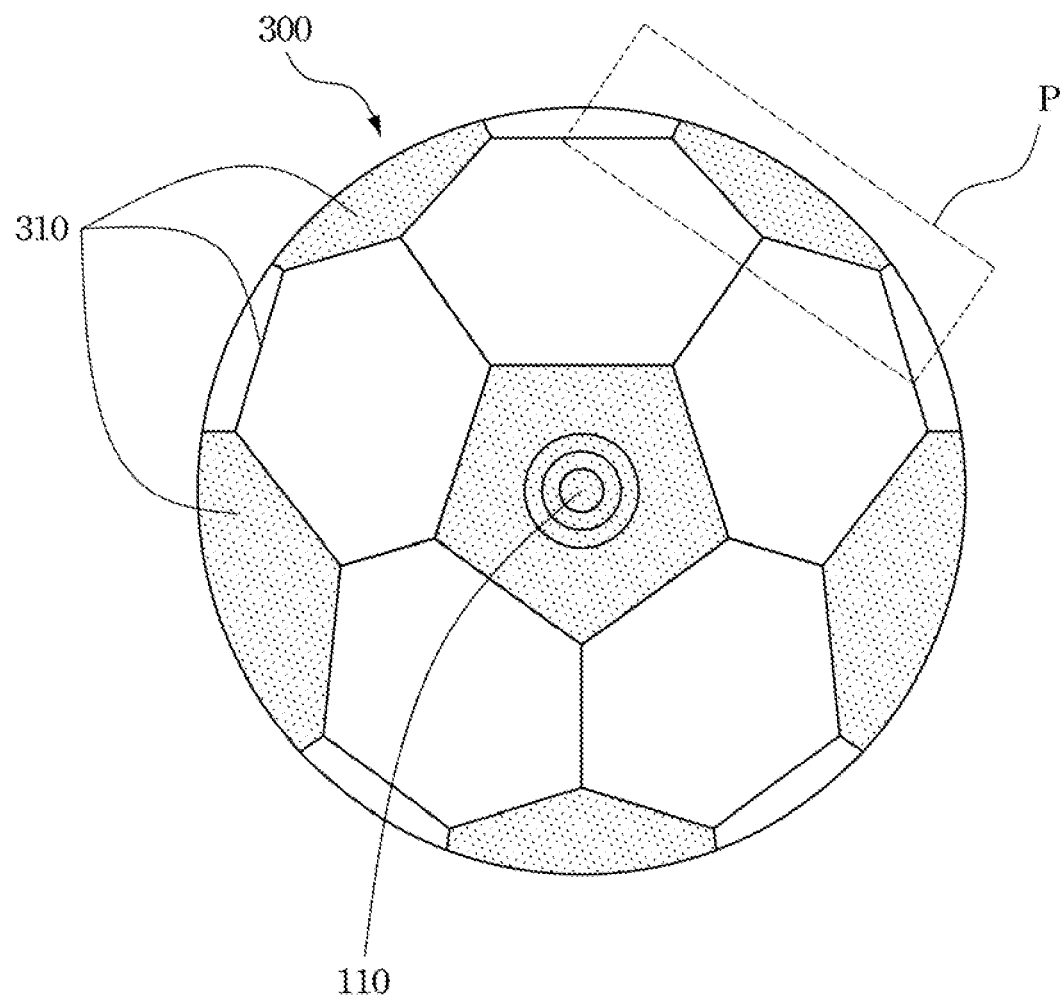
FIG. 2A is a schematic view of the inflatable sports ball of the present disclosure being applied to a soccer ball.
Figure 2B:
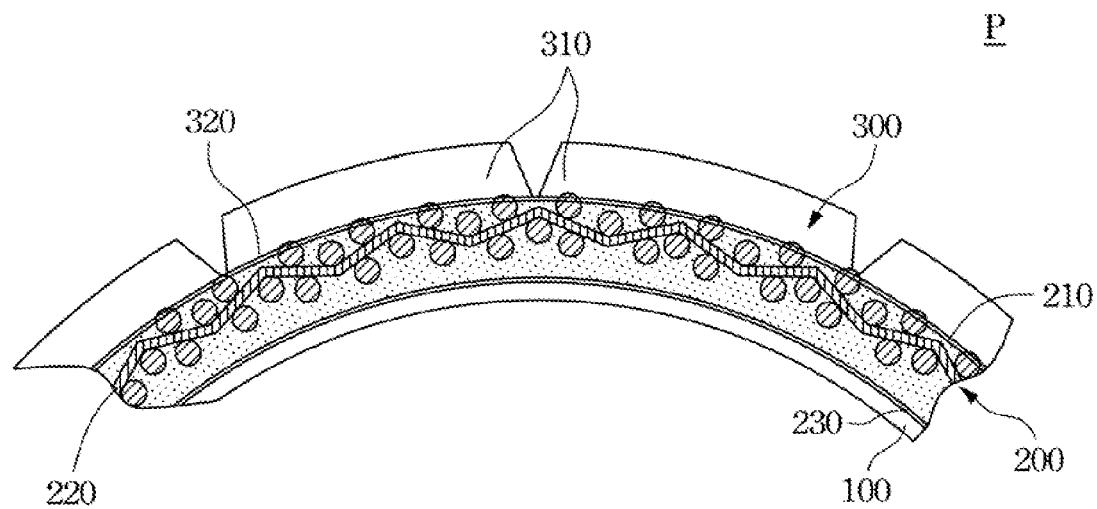
FIG. 2B is a partial cross sectional view of FIG. 2A.

Referring to FIG. 2A and FIG. 2B, wherein FIG. 2A is a schematic view of the inflatable sports ball of the present disclosure being applied to a soccer ball and FIG. 2B is a partial cross sectional view of FIG. 2A. The inflatable sports ball 10 comprises of an inner bladder 100, a reinforced carcass 200, a thread wound layer 220 and a external material layer 300. The reinforced carcass 200 covers the surface of the inner bladder 100. The external material layer 300 covers on the outer surface of the reinforced carcass 200. The thread wound layer 220 is thread processed in an interwoven pattern, and fully covers and is arranged around the outer surface of its circumference of the reinforced carcass 200.

Figure 3:
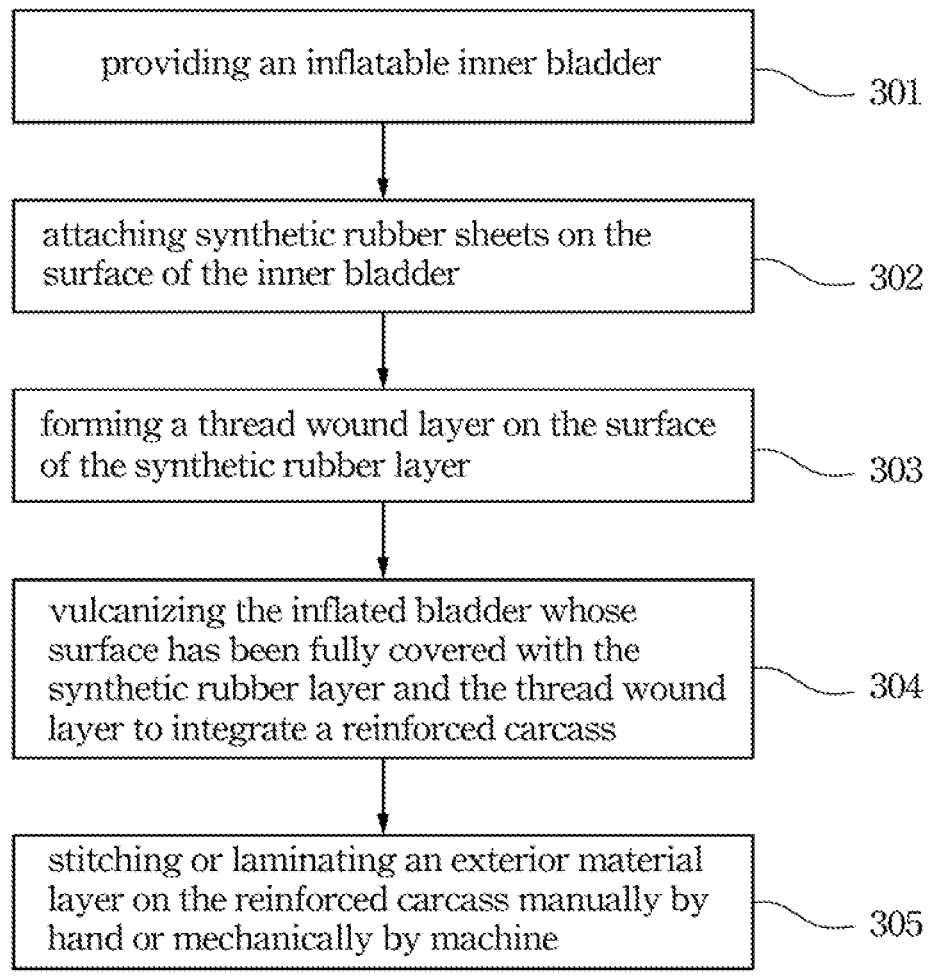
FIG. 3 is a flow chart of the manufacturing method of inflatable sports ball of the present disclosure.

Referring to FIG. 2A, FIG. 2B and FIG. 3. FIG. 3 is a flow chart of the manufacturing method of the inflatable sports ball of the present disclosure for illustrating a combination structure of the inner bladder 100, the reinforced carcass 200, the thread wound layer 220 and the exterior material layer 300.

STEP (301) provides an inflatable inner bladder 100:

In this step, an inner bladder 100, e.g. for a sports ball, is provided first, and an air inlet 110 (a combination of a valve housing and a valve core) is installed in the inner bladder 100, so that the inner bladder 100 can be inflated with a ball pin (not shown here) through the air inlet 110. After being inflated, the inside of the inner bladder 100 is filled with air to a certain air pressure, so as to achieve an appearance of a ball-shaped (spherical shape) surface.

The inner bladder 100 can be made of composite material of natural rubber, latex, or synthetic rubber, so an improved level of air retention as well as anti-air leakage function are provided. The synthetic rubber may include such materials as butyl rubber, neoprene rubber, or styrene-butadiene rubber.

STEP (302) attaches synthetic rubber sheets on the surface of the inner bladder 100:

In this step, because the inner bladder 100 has been filled with air to a certain air pressure and is placed in a machine-laminating mold, the outer surface of the inner bladder 100 can now be completely covered by a certain number of solid synthetic rubber sheets lined in the machine-laminating mold. Only the air inlet 110 installed with the ball pin is exposed while the outer surface of the inner bladder 100 is now ready to be integrated with the synthetic rubber layer to form a combined layer.

In addition, the synthetic rubber sheets can be attached to the outer surface of the inner bladder 100 by means of the first adhesive layer 230 in the operation of machine-laminating mold.

STEP (303) forms a thread wound layer 220 on the surface of the synthetic rubber layer 210:

In this step, on the surface of the synthetic rubber layer 210, a continuous thread, e.g. nylon thread, polyester thread or a mix of both, is wound around the outer surface of the synthetic rubber sheets from multiple directions in order to fully cover the surface and to form a thread wound layer 220. Several strands of continuous thread are firmly wound around the surface of the synthetic rubber layer 210 to offer a constricting force over the synthetic rubber sheets and towards the center of the inner bladder 100.

A thread spinning apparatus can be utilized to wind the needed thread onto the surface of the synthetic rubber layer 210.

STEP (304) vulcanizes the aforementioned inner bladder 100 whose surface has been fully covered with the synthetic rubber layer 210 and the thread wound layer 220.

During this step, the inner bladder 100 installed with the synthetic rubber layer 210 and the thread wound layer 220 on the surface thereof is placed in a curing mold which is then heated to 150-170 degrees Celsius. With this, the synthetic rubber sheets around the outer surface of the inflated inner bladder 100 start to soften and to integrate to form the synthetic rubber layer 210, which causes part of the thread wound layer 220 to fuse with the synthetic rubber layer 210 towards the direction of the center of the inner bladder 100, this fusion is what provides a constricting force towards the inner bladder 100. At this point, the reinforced carcass 200 is formed.

As an example, the inner surface of the curing mold which comes in contact with the pre-vulcanized carcass can be engraved with patterns, so after the previous procedure, the reinforced carcass 200 is imprinted with correspondent patterns that can facilitate the placement of the exterior material layer 300.

What is worth pointing out here is that the reinforced carcass 200 is not an integral part of the inner bladder 100 but is made from a special blend of synthetic rubber which, as compared with butyl rubber, offers better properties in rebound and tensile strength as well as a softer touch feeling after the inflatable sports ball 10 is completed.

STEP (305) stitches or laminates an exterior material layer 300 on the vulcanized reinforced carcass 200:

In this step, the design of the exterior material layer 300 can be configured according to various types of sports balls. Take soccer ball for an instance, the exterior material layer 300 can be composed of a number of genuine or artificial leather panels in the shape of polygons, e.g. pentagons or hexagons, and form the leather sheet units 310. Here, the exterior material layer 300 can be adhered to the surface of the reinforced carcass 200 through a second adhesive layer 320 with a manually adhering method (i.e. hand lamination) or with a mechanically adhering method (i.e machine lamination) (see FIG. 2B). Another choice is to stitch the exterior material layer 300 to the surface of the reinforced carcass 200 by means of manual sewing method (i.e. hand stitching) or a mechanical sewing method (i.e. machine stitching) (not shown in illustration) (see FIG. 2C).

As another example, when the exterior material layer 300 of the soccer ball is processed with hand lamination or machine lamination (see FIG. 2B), the pentagonal or hexagonal leather sheet units 310 are adhered to the outer surface of the reinforced carcass 200 with respect to the patterns on the reinforced carcass 200, so the lamination procedure of the exterior material layer 300 is simplified.

Figure 2C:
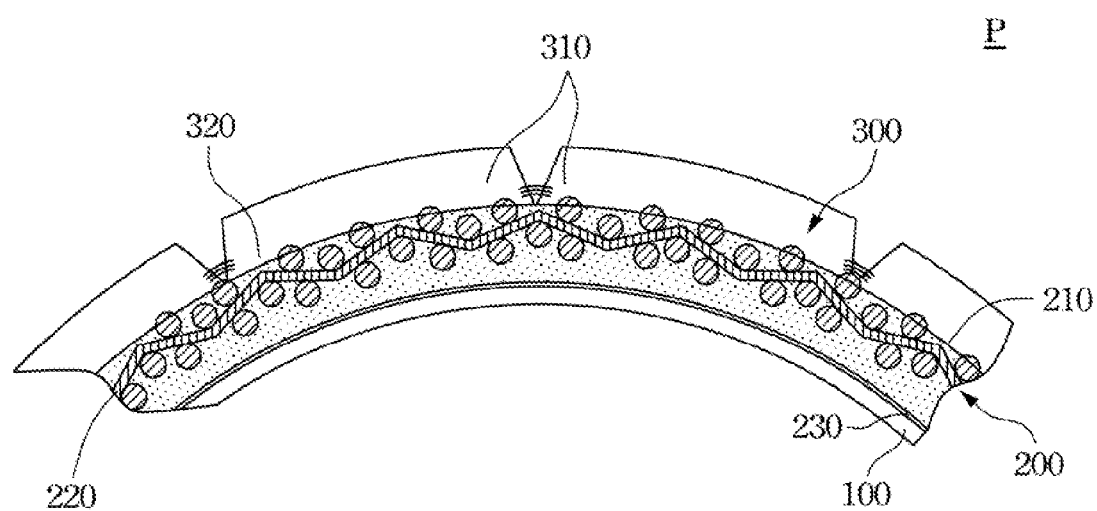
FIG. 2C is a partial cross sectional view with a stitched exterior material layer of the inflatable sports ball of the present disclosure.

The exterior material layer 300 of the soccer ball can also be processed with the hand stitching or machine stitching so that the leather sheet units 310 are stitched to the surface of the reinforced carcass 200 to form the exterior material layer 300 (see FIG. 2C).

As mentioned above, the combination of the synthetic rubber layer and the thread wound layer together provide a stronger thread wound force that increases the tolerance for internal air pressure, so the risk of the inner bladder bursting from over-inflation is significantly reduced. The reinforced carcass of the present disclosure can compensate the thickness of the exterior material layer to meet the standard weight requirement, and as a result the material cost for the exterior material layer is lowered.

The inflatable sports ball structure and the manufacturing method provided by the present disclosure can replace the conventional structure and manufacturing method, and not only lower the cost of production but also provide a better performance in rebound, tensile strength, and softness to the touch.

The reader's attention is directed to all papers and documents which are filed concurrently with his specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purposes, unless expressly stated otherwise. Thus, unless expressly stated otherwise, each feature disclosed is one example only of a generic series of equivalent or similar features.

What is claimed is:

1. An inflatable sports ball, comprising:
    a bladder having an outer surface;
    a carcass covering the outer surface of the bladder and having an outer surface facing away from the outer surface of the bladder;
    an exterior material layer covering the outer surface of the carcass; and
    a thread wound structure, wherein a majority of the thread wound structure is in the carcass, and a minority of the thread wound structure protrudes from the outer surface of the carcass and directly contacts the exterior material layer.

2. The inflatable sports ball of claim 1, wherein the bladder has a spherical shape.

3. The inflatable sports ball of claim 1, wherein the carcass is made of a synthetic rubber material.

4. The inflatable sports ball of claim 1, wherein the bladder is made of natural rubber, latex, synthetic rubber, or any combination thereof.

5. The inflatable sports ball of claim 1, wherein the bladder is made of natural rubber, latex, butyl rubber, neoprene rubber, styrene-butadiene rubber, or any combination thereof.

6. The inflatable sports ball of claim 1, further comprising:
    an adhesive layer between the outer surface of the carcass and the exterior material layer.

7. The inflatable sports ball of claim 1, wherein the exterior material layer is stitched onto the outer surface of the carcass.

* * * * *